United States Patent [19]

Williams et al.

[11] Patent Number: 4,890,947
[45] Date of Patent: Jan. 2, 1990

[54] MOUNTING ADAPTER HAVING LOCKING TAPER REMOVAL ARRANGEMENT

[75] Inventors: John F. Williams, New Cannan; George F. Silver, Newtown, both of Conn.

[73] Assignee: E. I. Du Pont De Nemours and Company, Wilmington, Del.

[21] Appl. No.: 262,996

[22] Filed: Oct. 26, 1988

[51] Int. Cl.$^4$ .............................................. B25G 3/00
[52] U.S. Cl. ........................................ 403/16; 403/24; 403/260
[58] Field of Search ............... 403/16, 258, 260, 24

[56] References Cited

U.S. PATENT DOCUMENTS

| | | | |
|---|---|---|---|
| 3,143,366 | 8/1964 | Nichols | 403/16 |
| 3,604,617 | 9/1971 | Patterson | 233/23 |
| 3,699,287 | 10/1972 | Stahl et al. | 200/61 |
| 3,708,111 | 1/1973 | Sheeler et al. | 233/32 |
| 3,770,191 | 11/1973 | Blum | 233/23 |
| 3,961,745 | 6/1976 | Wright | 233/1 |
| 3,990,633 | 11/1976 | Stahl et al. | 233/23 |
| 4,010,890 | 3/1977 | Wright | 233/1 |
| 4,101,070 | 7/1978 | Hoare et al. | 233/1 |
| 4,120,450 | 10/1978 | Whitehead | 233/26 |
| 4,205,779 | 6/1980 | Jacobson | 233/24 |
| 4,214,179 | 7/1980 | Jacobson et al. | 310/68 |
| 4,226,359 | 10/1980 | Jacobson | 233/24 |
| 4,322,030 | 3/1982 | Jacobson | 233/23 |
| 4,344,563 | 8/1982 | Romanauskas | 233/26 |
| 4,360,151 | 11/1982 | Cowell et al. | 233/27 |
| 4,435,169 | 3/1984 | Romanauskas | 494/20 |
| 4,449,965 | 5/1984 | Strain | 494/16 |
| 4,457,737 | 7/1984 | Sharples | 464/99 |
| 4,484,906 | 11/1984 | Strain | 494/16 |
| 4,507,110 | 3/1985 | Boeckel | 494/10 |
| 4,553,955 | 11/1985 | Lam et al. | 494/16 |
| 4,693,702 | 9/1987 | Carson et al. | 494/61 |
| 4,753,630 | 6/1988 | Romanauskas | 494/9 |
| 4,753,631 | 6/1988 | Romanauskas | 494/9 |

FOREIGN PATENT DOCUMENTS

| | | | |
|---|---|---|---|
| 583250 | 5/1929 | Fed. Rep. of Germany | 29/614 |
| 887088 | 1/1962 | United Kingdom | 403/258 |

OTHER PUBLICATIONS

Sorvall Centrifuge RC-5 & RC-B Service Manual, pp. 8-28.
Sorvall Engineering Drawing No. 51190-4.
Du Pont Engineering Drawing No. 51382.

*Primary Examiner*—Andrew V. Kundrat

[57] ABSTRACT

A mounting adapter for a centrifuge includes an internal chamber having a lifting and a locking surface therein. The head of a connecting member is captured in the chamber and is rotatable by a tool insertable through an access bore in opposed angular directions. Rotating the connecting member in one direction brings it into abutting contact with the locking surface to hold tapered surface surfaces on the adapter and on the spindle in locked engagement. Rotation of the connecting member in the opposed direction causes the same to abut against the lifting surface to assist in separating the tapered surface from each other.

5 Claims, 1 Drawing Sheet

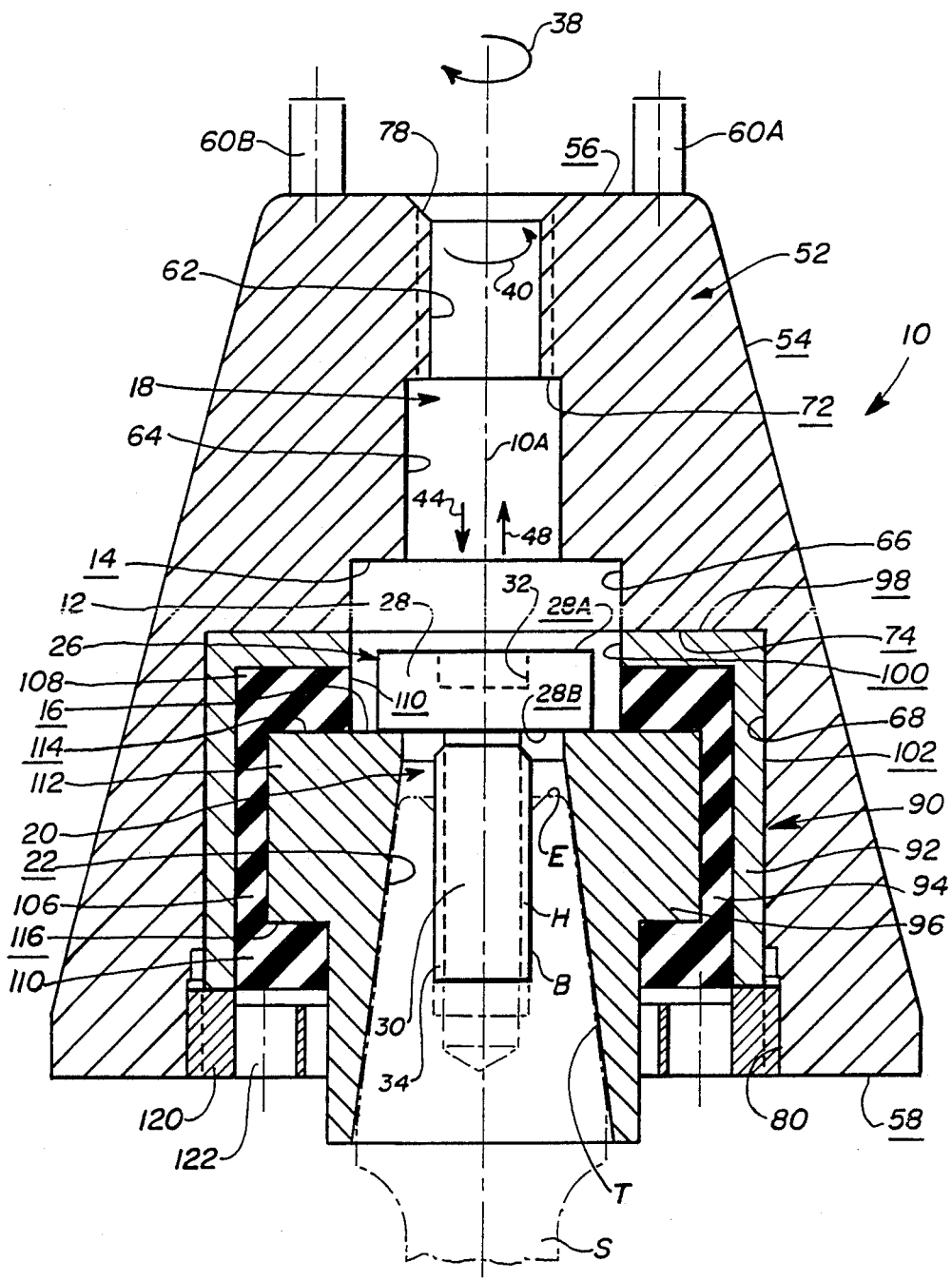

MOUNTING ADAPTER HAVING LOCKING TAPER REMOVAL ARRANGEMENT

BACKGROUND OF THE INVENTION

1. Field of the Invention

The present invention relates to a mounting adapter for mounting a rotor to the spindle in a centrifuge instrument, the adapter being of the type having a locking taper surface thereon adaptable to engage a correspondingly tapered surface on the drive spindle of the instrument and, in particular, to an adapter provided with a removal arrangement for separating the engaged tapered surfaces of the adapter and the spindle.

2. Description of the Prior Art

The centrifuge instrument manufactured and sold by E. I. DuPont de Nemours and Company Inc. as the RC-5C instrument includes a source of motive energy to which is attached an elongated drive spindle. The uppermost end of the spindle is terminated with an enlarged, generally cylindrical, flexible coupling member. The flexible coupling member is received by a drive spindle/pin assembly, or spud, on which the centrifuge rotor is mounted. The flexible coupling member includes an elastomeric layer bonded to the end of the spindle. The elastomeric layer is surrounded by a cylindrical metal cap. The spud includes a shell member having a cylindrical recess formed therein which accepts the cap of the flexible coupling. The flexible coupling is held in place in the spud by a threaded clamp ring which engages threads formed on the shell. The clamp ring is secured to the outer shell by a set screw to prevent the clamp ring from walking off the shell. The set screw has a nylon tip so as not to mar the threads of the clamp ring. The spud is provided with a generally frustoconical lateral surface and a generally planar upper surface thereon. The planar end surface of the shell has drive pins projecting therefrom. These drive pins, when received within a groove formed on the lower surface of a rotor, act against corresponding pins disposed in the rotor groove to impart rotational motion to the rotor.

With such an arrangement it is diffficult to remove the tapered outer shell member from the spindle. The difficulty primarily attends the insertion of a suitable spanner into openings in the clamp ring. Only when the spanner is properly inserted may an opening torque be applied to the clamp ring to permit removal of the tapered outer member from the end of the spindle.

In the centrifuge instrument manufactured and sold by E. I. DuPont de Nemours and Company Inc. as the OTD ultracentrifuge the upper end of the drive spindle from the oil turbine drive element itself exhibits a tapered surface. The tapered upper end of the spindle is inserted into a correspondingly tapered recess of a rotor drive adapter. The outer surface of the drive adapter is configured to engage a correspondingly shaped recess in a rotor whereby the rotor is directly mountable on the drive adapter. The engagement of the tapered surfaces at the upper end of the spindle and on the inner surface of the adapter form a locking taper fit. A locking taper fit is advantageous because it prevents separation of the rotor from the drive spindle and provides concentricity between the rotor and the spindle.

Due to the presence of the locking taper fit a special tool is required to remove the adapter from the spindle. This tool is clamped about a boss on the outer periphery of the drive adapter. A threaded bolt that is carried within the tool extends downwardly through a central opening in the adapter and rests against the top of the spindle. As the bolt is rotated it acts against the spindle to exert a lifting force on the adapter to raise the same from the spindle.

In view of the foregoing it is believed advantageous to provide a rotor mounting adapter for a centrifuge instrument that uses a locking taper fit but which includes a locking taper removal arrangement whereby the spindle and the adapter can be easily separated from each other.

SUMMARY OF THE INVENTION

The present invention relates to a mounting adapter for a centrifuge rotor, the adapter being receivable on the end of the drive spindle of the instrument. The drive spindle is of the type having a frustoconical locking taper surface at the upper end thereof and a central axial threaded bore extending thereinto from the upper end thereof. The adapter includes a spud member having an internal chamber disposed therein. The chamber is defined in part by a first, lifting, and a second, locking, surface. An access bore and a mounting bore extend through the spud, both of the bores communicating with the internal chamber. The mounting bore has a tapered surface conforming to the locking taper surface on the spindle. A threaded connecting member having a head with a depending threaded shank is disposed such that the head is captured within the internal chamber of the spud while the shank extends into the mounting bore.

The connecting member is rotatable in first and second opposed angular directions using a tool extendable through the access bore into engagement with the head of the connecting member. Rotation of the connecting member is a first angular direction causes the threads on the locking member to engage with the threads in the bore at the upper end of the spindle and brings the head into abutting contact with the locking surface. Abutting contact between the head and the locking surface imposes a locking force acting in a first direction on the mounting member thereby to secure the tapered surface on the spindle with the tapered surface on the mounting spud. Conversely, rotation of the connecting member in the second, opposed, angular direction withdraws the threaded shank from the bore in the spindle and brings the head into abutting engagement with the lifting surface to impose a lifting force acting on the spud in a second opposed, direction, thereby to break the engagement between the tapered surfaces of the spindle and the mounting member.

In the preferred case the spud includes an outer shell having the lifting surface and the access bore therethrough and an inner insert having the locking surface and the tapered bore therein. The insert is received within a cavity in the outer shell and secured therein by a threaded locking ring.

BRIEF DESCRIPTION OF THE DRAWING

The invention would be more fully understood from the following detail description thereof taken in connection with the drawing figure which forms a part of the application and which depicts a side elevational view entirely in section of a mounting adapter in accordance with the present invention.

DETAIL DESCRIPTION OF THE INVENTION

The mounting adapter in accordance with the present invention is generally indicated by reference character 10 and is arranged to facilitate the mounting of a centrifuge rotor (not shown) to the upper end E of the spindle S of the instrument. The spindle S, which is shown in dot-dash lines to differentiate it from the adapter 10, has a central axial bore B extending a predetermined distance thereinto from the upper end E. The bore B has threads H over a portion of its axial length. A frustoconical locking taper surface T is provided on the spindle S adjacent to the end E thereof.

In its most basic form the mounting adapter 10, also known as the "spud", has an internal chamber 12 bounded at least in part by first, lifting, surface 14 and a second, locking, surface 16. The adapter 10 has an access bore 18 and a mounting bore 20 extending therethrough. Both of the bores 18, 20 in the adapter 10 communicate with the internal chamber 12. The access bore 18 may assume any convenient configuration while the mounting bore 20 is bounded by a tapered surface 22 corresponding in shape to the frustoconical locking taper surface T on the spindle.

A connecting member 26 has an enlarged head 28 therein and a depending shank 30. The head 28 has upper and lower working surfaces 28A and 28B, respectively, thereon. The upper working surface 28A of the head 28 has a hexagonal drive opening 32 therein while the shank 30 has external threads 34 thereon. The head 28 is captured and confined within the internal chamber 12, with the shank 30 extending into the mounting bore 20. The connecting member 26 is rotatable in first and second opposed angular directions, indicated with respect to the central axis 10A of the adapter 10 by the reference arrows 38 and 40, respectively, by a tool (not shown) extendable through the access bore 18 into engagement with the head 28 of the connecting member 26. In the preferred instance the head 28 is illustrated as having the opening 32 therein. However, it should be appreciated that any suitable configuration of the head 28 may be used so long as the connecting member 26 is manipulable using a suitable tool extendable through the access bore 18. Suitable for use as the tool in the preferred instance is an Allen wrench.

In accordance with the present invention rotation of the connecting member 26 in the first angular direction 38 causes the threads 34 on the shank 30 to engage with the threads H provided in the bore B at the upper end E of the spindle S. As the threads 34 on the shank 30 engage with the threads H in the spindle S the lower working surface 28B of the head 28 is brought into abutting contact against the locking surface 16 to impose a locking force acting in a locking direction 44 extending generally parallel to the axis 10A of the adapter 10. The locking force 44 urges the tapered surface 22 toward the tapered surface T on the spindle S to hold these surfaces in locking engagement.

Conversely, to remove the mounting adapter 10 from the spindle S, the connecting member 26 is rotated in the second angular direction 40. This action unthreads the threads H on the spindle S from the threads 34 on the connecting member 26 and moves the upper working surface 28A on the head 28 into abutting engagement with the lifting surface 14. A lifting force acting in a direction 48 parallel to the axis 10A (and opposed to the direction 44 of the locking force) is thereby imposed on the adapter 10. The lifting force displaces the adapter 10 with respect to the upper end E of the spindle S and thus assists in separating the engaged locking tapered surfaces T (on the spindle S) and 22 (on the adapter 10).

In the preferred embodiment the mounting adapter 10 includes an outer shell member 52 formed of stainless steel, titanium, or other suitable material. The shell 52 has a generally frustoconical external lateral surface 54, a planar annular upper surface 56 and an annular lower surface 58 formed thereon. The lateral surface 54 matches the configuration of a mounting recess formed in the underside of a centrifuge rotor, whereby the rotor may be received on the adapter 10. It should be understood that the lateral surface 54 may take any convenient shape compatible with the shape of the recess in the rotor received thereon. A pair of drive pins 60A and 60B are set into the material of the shell 52 and project upwardly from the annular surface 56 in accordance with well-known practice in the art.

The shell 52 has a series of generally cylindrical communicating bore segments 62, 64, 66 and 68 formed therein, with the radius of each successive bore (as measured from the axis 10A of the adapter) increasing as the bores proceed from the upper surface 56 toward the lower surface 58 of the shell 52. Annular surfaces 72 and 74 are respectively disposed between the bore segments 62, 64 and between the bore segments 66, 68. The annular lifting surface 14 discussed earlier is defined between the bore segments 64 and 66. A frustoconical lead-in segment communicates with the bore segment 62, which is threaded, as at 78, while the lower end of the bore 68 adjacent the lower surface 58 of the shell 52 is also threaded, as at 80.

The mounting adapter 10 includes an inner member, or insert, generally indicated by reference character 90. The insert 90 comprises an outer cap 92 in the form of an inverted cup-shaped member, a flexible elastomeric member 94 and a plug 96. The cap 92, preferably formed of stainless steel, has an annular upper surface 98 with a central opening bounded by a cylindrical wall 100. The outer lateral surface 102 of the cap is also generally cylindrical. The upper surface 98 corresponds in size with the area of the annular surface 74 in the shell 52.

The elastomeric member 94 includes a generally cylindrical central portion 106 partially closed by upper and lower flanges 108, 110, respectively. The upper flange 108 has a central opening bounded by a cylindrical wall 110 that registers axially with the cylindrical wall 100 in the cap 92. Suitable for use as the member 94 is the part formed of a fifty durometer neoprene and natural rubber blend manufactured by Lord Corporation, Shelton, Conn., and sold under part number NE13242, although any other fifty (plus or minus five) durometer elastomeric blend may be used.

The plug 96 has an enlarged base portion 112 with upper and lower planar surfaces 114, 116, respectively. The plug 96 is preferably formed of the same material as the cap. The lower planar surface 116 of the plug 96 is completely overlaid by the lower flange 110. However, the upper planar surface 114 is only partially overlaid by the upper flange 110, with the exposed portion of the surface 114 defining the annular locking surface 16. The elastomeric member 94 and the cap 92 and the plug 96 are vulcanized to form the member 90 as an integral assembly. The cap 92 and the plug 96 should be concentric to within 0.001 inch during the vulcanizing process. The insert 90 should be normalized to approximately twenty degrees Centrigrade for seven days prior to fianl dimensioning.

The cylindrical bore 68 and the annular surface 74 in the shell 52 cooperate to define a cavity therein that is sized to closely receive the insert 90. The insert 90 is held in place within the outer shell by a clamp ring 120 that is threaded to the threads 80 adjacent the lower surface 58 of the shell 52. The clamp ring 120 has spanner openings 122 provided therein. The cylindrical walls 100 (in the cap 92) and 110 (in the elastomeric member 96) align axially with each other and with the cylindrical bore 66 in the shell 52 and cooperate to define the internal chamber 12.

Those skilled in the art, having the benefit of the teachings of the present invention may impart numerous modifications thereto. It should be understood, however, that such modifications lie within the contemplation of the present invention, as defined by the appended claims.

What is claimed is:

1. A mounting adapter for a centrifuge rotor, the mounting adapter being receivable on the end of the drive spindle itself having a threaded bore therein and a frustoconical locking taper surface thereon, the mounting adapter comprising;
    a spud member having an internal chamber therein, the chamber being defined in part by a first, locking, surface and a second, lifting, surface, the spud member having an threaded access bore and a mounting bore extending therethrough, the mounting bore being bounded by a tapered surface corresponding in shape to the frustoconical locking taper surface on the spindle, both the access bore and the mounting bore being in communication with the internal chamber; and
    a connecting member having a head and a threaded shank thereon, the head being confined within the internal chamber with the shank extending into the mounting bore, the connecting member being rotatable in first and second opposed angular directions by a tool extendable through the access bore into engagement with the head of the connecting member,
    rotation of the connecting member in the first angular direction threadedly engaging the shank with a threaded bore disposed in a drive spindle and bringing the head into abutting contact with the locking surface thereby to impose a locking force acting in a first direction on the spud member to hold the mounting surface thereon and the frustoconical surface on the spindle in locking engagement,
    rotation of the threaded member in the second angular direction unthreading the shank from the threaded bore in the spindle and causing the head to abut against the lifting surface thereby to impose a lifting force acting in a second, opposed, direction on the spud member to assist in separating the mounting surface on the spud member from the frustoconical surface on the spindle.

2. The mounting adapter of claim 1 wherein the spud member comprises an outer shell having the lifting surface thereon and the access bore therethrough and an inner insert having the locking surface and the mounting bore therethrough.

3. The mounting adapter of claim 2 wherein the insert is fixedly connectable to the outer shell.

4. The mounting adapter of claim 1 further comprising an outer shell having a threaded cavity therein, the lifting surface thereon and the access bore therethrough;
    an insert receivable in the cavity in the outer shell, the insert having the locking surface thereon and the mounting bore therethrough, and,
    a clamp ring engaging the threads in the outer shell to secure the insert within the outer shell.

5. A mounting adapter for a centrifuge rotor, the mounting adapter being receivable on the the end of the drive spindle itself having a threaded bore therein and a frustoconical locking taper surface thereon, the mounting adapter comprising:
    a spud member having an internal chamber therein, the chamber being defined in part by a first, locking, surface and a second, lifting, surface, the spud member having an access bore and a mounting bore extending therethrough, the mounting bore being bounded by a tapered surface corresponding in the shape to the frustoconical locking taper surface on the spindle, both the access bore and the mounting bore being in communication with the internal chamber,
    the spud member itself comprising:
    an outer shell having a threaded cavity therein, the lifting surface theron and the access bore therethrough;
    an insert receivable in the cavity in the outer shell, the insert having the locking surface thereon and the mounting bore therethrough, and
    a clamp ring engaging the threads in the outer shell to secure the insert within the outer shell; and
    a connecting member having a head and a threaded shank thereon, the head being confined within the internal chamber with the shank extending into the mounting bore, the connecting member being rotatable in first and second opposed angular directions by a tool extendable through the access bore into engagement with the head of the connecting member,
    rotation of the connecting member in the first angular directin threadedly engaging the shank with a thread bore disposed in a drive spindle and bringing the head into abutting contact with the locking surface thereby to impose a locking force acting in a first direction on the spud member to hold the mounting surface thereon and the frustoconical surface on the spindle in locking engagement,
    rotation of the threaded member in the second angular direction unthreading the shank from the threaded bore in the spindle and causing the head to abut against the lifting surface thereby to impose a lifting force acting in a second, opposed, direction on the spud member to assist in separating the mounting surface on the spud member from the frustoconical surface on the spindle.

* * * * *